United States Patent [19]
Buccieri

[11] 3,883,869
[45] May 13, 1975

[54] ACQUISITION LOGIC CIRCUITRY

[75] Inventor: Peter M. Buccieri, Bridgeport, Conn.

[73] Assignee: The United States of America as represented by the Secretary of the Navy, Washington, D.C.

[22] Filed: Dec. 2, 1970

[21] Appl. No.: 128,599

[52] U.S. Cl............................................. 343/7 A
[51] Int. Cl.............................................. G01s 7/02
[58] Field of Search................................... 343/7 A

[56] References Cited
UNITED STATES PATENTS

| 3,343,160 | 9/1967 | Beals et al. | 343/7 A |
| 3,803,603 | 4/1974 | Perot | 343/7 A |

*Primary Examiner*—T. H. Tubbesing
*Attorney, Agent, or Firm*—R. S. Sciascia; G. J. Rubens; T. M. Phillips

[57] ABSTRACT

A logic circuit for generating an acquiring and locking signal for locking the missile antenna to the main beam of an airborne missile control system antenna. The logic circuit detects and measures the peak automatic gain control voltage of the missile receiver as the missile antenna scans in one direction. After the target illuminating signal from the launching aircraft has been detected, the missile antenna scans in the other direction until the automatic gain control voltage of the missile receiver equals the previously measured voltage.

3 Claims, 2 Drawing Figures

ACQUISITION LOGIC CIRCUITRY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a means for providing a lock-on signal while acquiring a radiating source with a tracking antenna and more particularly to providing a lock-on signal while acquiring a radiating source from a launching aircraft with the acquiring and tracking antenna mounted in the missile launched by the launching aircraft. Previously known systems for acquiring a radiating source with a tracking antenna have included the use of a wide beam auxilliary tracking antenna which provided rough directional control for the acquisition. The actual acquisition was made by a narrow beam antenna scanning in wide angle while measuring and storing amplitude and angle data. This information would be later used for signal source selection. The present invention provides an improvement over the prior known systems by providing a system which requires no auxiliary antenna; no complex measurements, storage, or signal selection equipment; and the equipment required to implement the present invention is not complex and is relatively light and inexpensive.

Accordingly, an object of the present invention is to provide a system for automatically acquiring a radiating source with a tracking antenna.

Another object of the invention is the provision of a system for automatically acquiring a radiating source with a tracking antenna that requires no auxiliary antenna or complex measurement and storage signal selection equipment.

Other objects, advantages and novel features of the invention will become apparent from the following detailed description of the invention when considered in conjunction with the accompanying drawings wherein.

Figure 1:
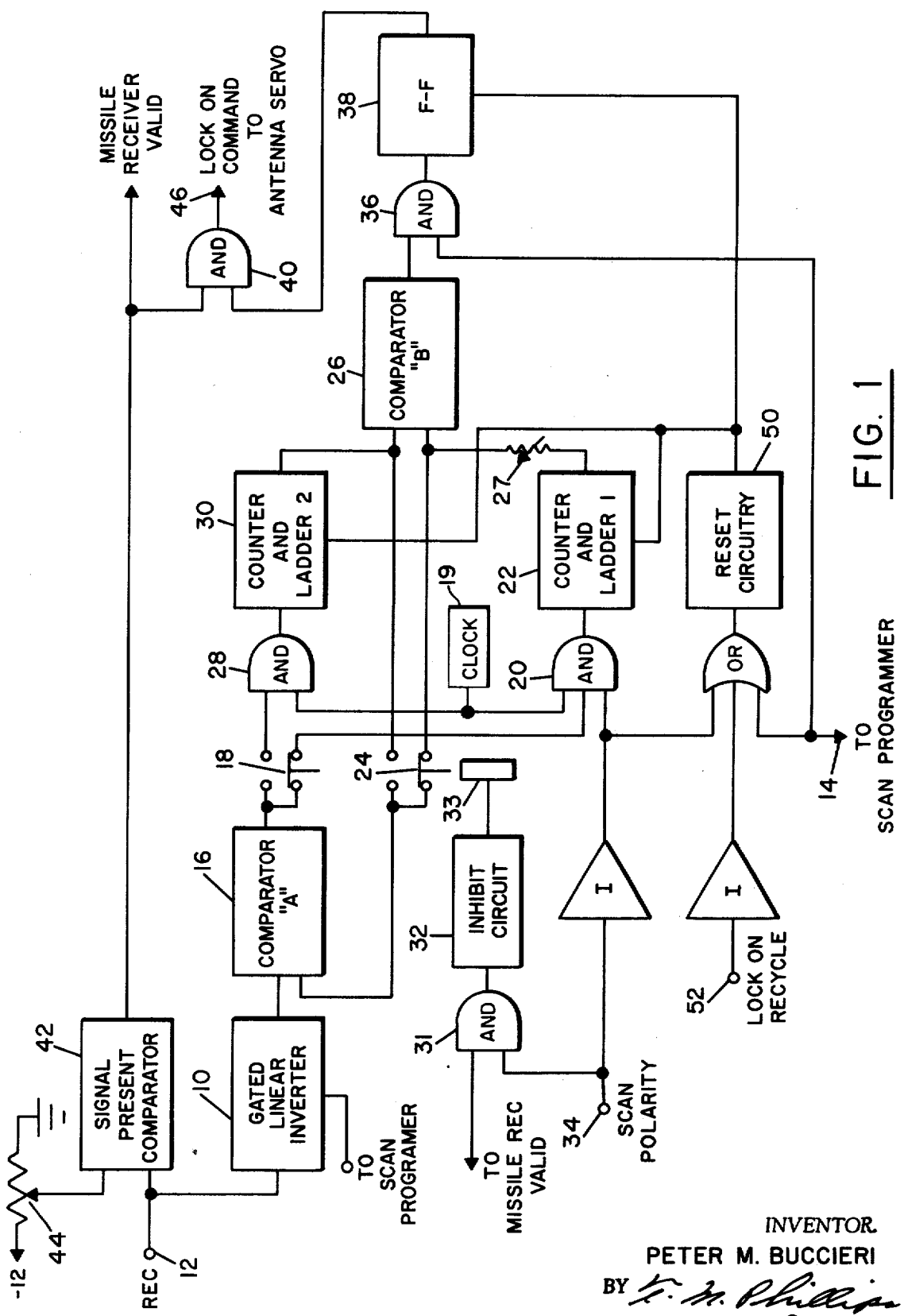
FIG. 1 is a block diagram of a preferred embodiment of the invention.

Referring now to FIG. 1 there is shown a gated linear inverter 10 for receiving input signals from the missile receiver (not shown) at terminal 12. Gated inverter 10 is gated by means of scan programmer signals coupled from terminal 14 which receives signals from a scan programmer (not shown). The output of gated inverter 10 is coupled to the input of comparator 16. The output of comparator 16 is connected through switch 18 and AND circuit 20 to counter circuit 22. The output of counter 22 is connected through switch 24 as a second input to comparator 16 and as one input to comparator 26. When ganged switches 18 and 24 are in the second position comparator 16 is connected to AND circuit 28 and counter 30. The output of counter 30 is then connected as the other input to comparator 16 and as the second input to comparator 26. An inhibit circuit 32 is provided to prevent counter 30 from counting before counter 22 and is controlled by means of a scan polarity signal provided at terminal 34. The output of comparator 26 is fed through AND circuit 36 to flip-flop circuit 38 which provides an output signal to AND circuit 40. A signal present comparator 42 has a reference voltage applied from reference source 44 so that a signal will be fed to AND circuit 40 only when the input signal to signal present comparator 42 exceeds its reference voltage. When the two signals are present in AND circuit 40 a lock on command signal is provided at output terminal 46 which may be fed to the antenna servo. Reset circuitry 50 is provided to reset flip-flop 38, counters and the inhibit circuit to 0 and is triggered by means of either the scan programmer signal at terminal 14, the lock-on recycle signal from terminal 52 or the scan polarity signal at terminal 34.

Counter circuits 22 and 30 function in the conventional manner of counting pulses from clock 19 and providing an output voltage proportional to the number of pulses counted.

Figure 2:
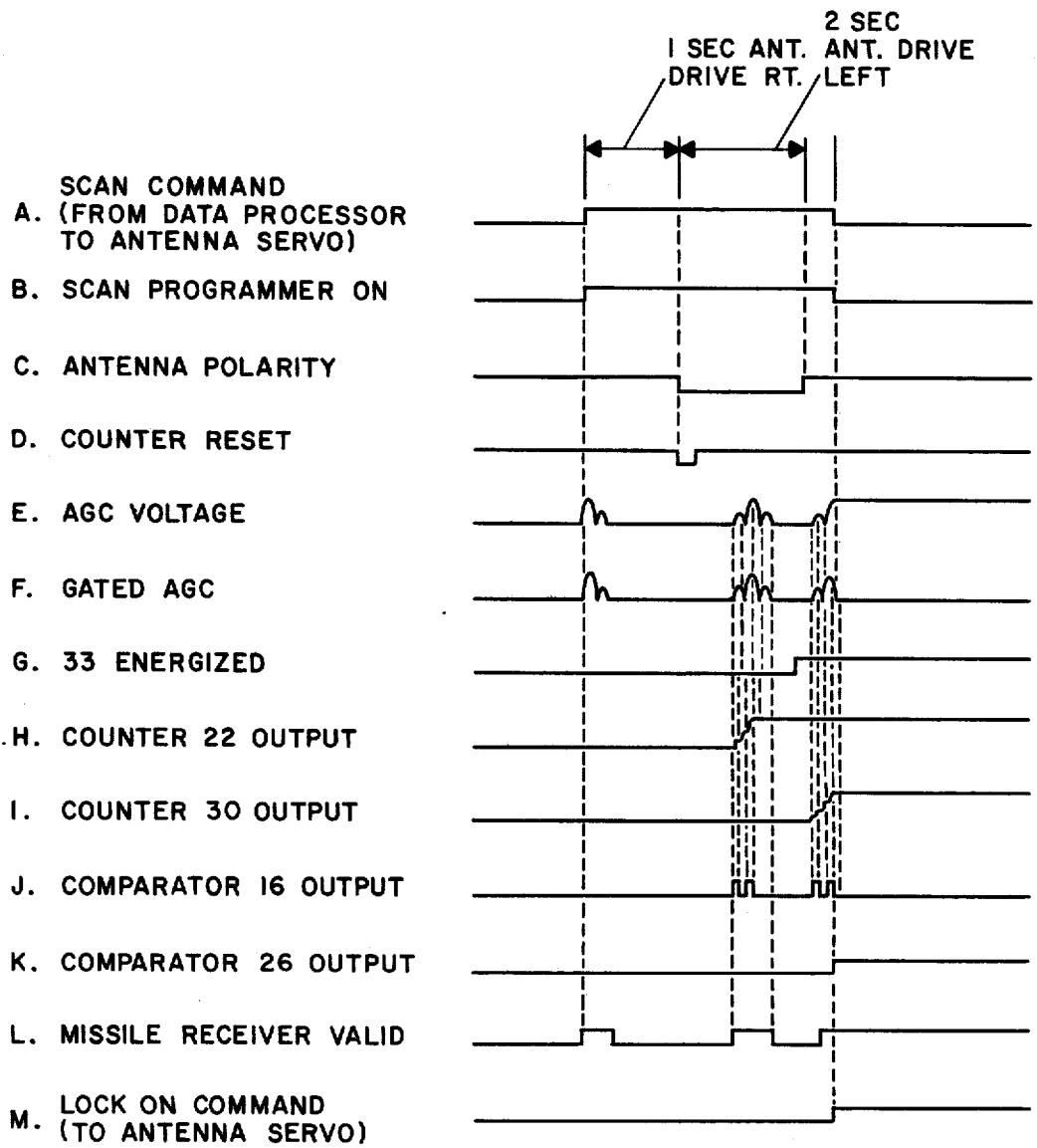
FIG. 2 is a graph of waveforms used in describing the operation of the embodiment of FIG. 1.

In operation, the scan programmer signal (waveform B, FIG. 2) at terminal 14 resets counters 22 and 30 to 0 and flip-flop circuit 38 to its proper state. As the antenna (not shown) scans left the AGC voltage (waveform E) at terminal 12 appears as the input to gated linear inverter 10 which is enabled by the scan programmer signal from terminal 14. This voltage is applied as a first input of comparator 16 (waveform F). The output signal from comparator 16 appears as a digital positive signal (1) and in conjunction with the inverted scan polarity (antenna scans left = 0) causes the output of AND gate 20 to go to "1" state. This enables counter 22 to start counting until its output (waveform H) which is applied as the second input of comparator 16 is equal to the AGC voltage applied as the first input to comparator 16. At this time the output of comparator 16 changes from the high state to the low ("1" to "0"), dissatisfying AND gate 20, stopping counter 22. The output of counter 22 is also the second input of comparator 26 and is attenuated 50 to 100 mVs by means of variable resistor 27. This is done to compensate for the loss in AGC which is caused by the missile being further from the launching aircraft on the second scan. The purpose is to allow the margin of switching for comparator 26 when counter 30 counts to the peak AGC.

The scan polarity signal going to "1" (antenna scans right) causes the output from inhibit circuit 32 to energize relay 33. When relay 33 is energized it causes the output of counter 30 to be connected as the second input to comparator 16 and the output of comparator 16 to be connected to the input of AND gate 28. The output of counter 30 is also connected as an input to comparator 26. Now counter 30 starts to count until its output (waveform I) is equal to the peak AGC voltage, at this point the output of comparator 16 changes from a high to a low ("1" to "0") dissatisfying AND gate 28 stopping counter 30. Comparator 26 now supplies a "1" output (waveform K) to AND gate 36 which is ANDED with the scan programmer signal from terminal 14, triggering flip-flop circuit 38. Flip-flop circuit should be connected such that it always ends up in the same state when power is turned on. The scan programmer signal at terminal 14 is connected to AND gate 36 so that, under no conditions, can flip-flop circuit 38 be in the state required to produce a lock-on command signal without a scan program signal being present. The output from flip-flop circuit 38 is ANDED with the missile receiver valid signal from signal present comparator 42 by AND gate 40 providing the lock-on command signal at output terminal 46 which is fed to the antenna servo, not shown.

Signal present comparator 42 compares the AGC voltage to a fixed reference voltage supplied from the tap of variable potentiometer 44. When the AGC voltage is greater than the reference voltage (about a negative or 100 dbm input signal at the mixer input) the signal present comparator missile receiver valid signal output becomes a "1," see waveform L in FIG. 2. The missile receiver valid signal is also ANDED together with the scan polarity signal at AND gate 31, which then goes to the inhibit circuit 32. This feature is provided in order to prevent the antenna from locking to noise; i.e., must have signal present before acquisition can be obtained.

Obviously many modifications and variations of the present invention are possible in the light of the above teachings. It is therefore to be understood that within the scope of the appended claims the invention may be practiced otherwise than as specifically described.

What is claimed is:

1. In an acquisition logic circuit for acquiring a radiating source with a tracking antenna the combination comprising:
    a. a first comparator circuit having a first input coupled to a signal source and having a second input and an output;
    b. a first counting circuit having an input and an output;
    c. a second counting circuit having an input and an output;
    d. switch circuit means coupled to said first comparator circuit and to said first and second counting circuits for successively comparing the outputs of said first and second counting circuits with the input of said first comparator circuit;
    e. second comparator circuit means having a first input coupled to the output of said first counter and a second input connected to the output of said second counter and generating an output signal when said two inputs are equal;
    f. an AND circuit having a first input coupled to the output of said second comparator circuit and having a second input coupled to a valid signal indicator for producing an output signal representing alignment of the missile antenna with the radiating source.

2. The logic circuit of claim 1 wherein said switch circuit means is connected in circuit with an AND gate to an energizing means, an enabling signal source coupled to said AND gate for enabling said AND gate after said first counting circuit stops counting.

3. The logic circuit of claim 1 wherein said switch circuit means has a first position connecting the output of said first comparator to the input of said first counter circuit and connecting the output of said first counter circuit to the second input of said first comparator and has a second position connecting the output of said first comparator to the input of said second counter and connecting the output of said second counter to said second input of said first comparator.

* * * * *